Jan. 7, 1930.  H. A. STAPLES  1,742,793
CONDENSER TUBE FASTENING
Filed June 9, 1926
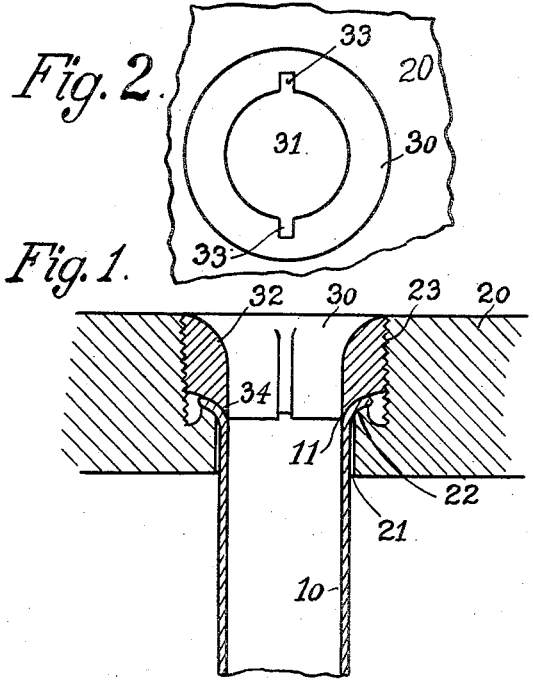
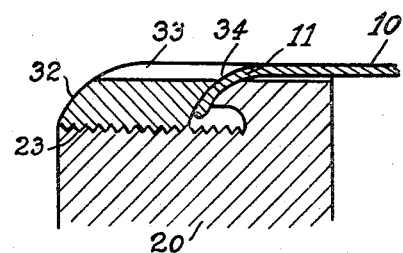
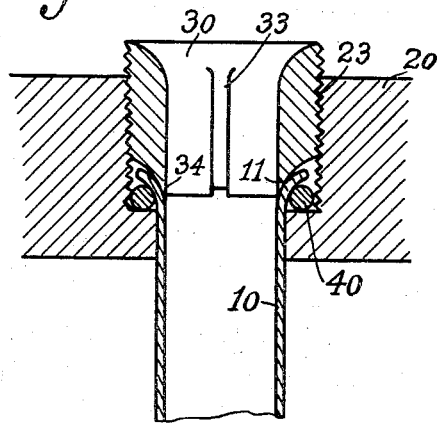
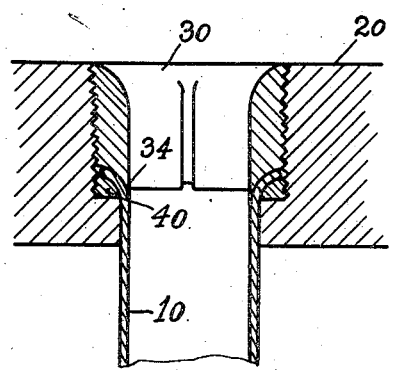
INVENTOR
HORACE A. STAPLES.
BY
ATTORNEY Patented Jan. 7, 1930

1,742,793

UNITED STATES PATENT OFFICE

HORACE A. STAPLES, OF PLAINFIELD, NEW JERSEY, ASSIGNOR TO NATIONAL ELECTRIC PRODUCTS CORPORATION, OF NEW YORK, N. Y., A CORPORATION OF DELAWARE

CONDENSER-TUBE FASTENING

Application filed June 9, 1926. Serial No. 114,788.

My invention relates to condenser tube fastenings and has for its object to provide a fastening for the purpose which produces a tight metal to metal joint between the tube and tube sheet at the same time providing an unobstructed flow at the entrance of the tube.

A further object is to produce a fastening that provides a flush tube sheet with a Venturi opening and a smooth inner face at the entrance to the tubes.

A further object of my invention is to provide a fastening that will permit of a thinner tube sheet at the same time to provide a fastening which may be used on old condensers provided with counterbore openings for replacement purposes.

The foregoing and other features of my invention will now be described in connection with the accompanying drawings forming part of this specification in which I have represented my fastening in its preferred form, after which I shall point out in the claims those features which I believe to be new and of my own invention.

In the drawings:

Figure 1 is a cross section of my fastening.

Figure 2 is an end view thereof.

Figure 3 is an enlarged part section showing the metal to metal joint between the tube and tube sheet.

Figure 4 is a cross section similar to that shown in Figure 1 showing its application to an old tube sheet provided with the usual counterbore at tube openings.

Figure 5 is a cross section similar to that shown in Figure 4 with the ferrule screwed in place leaving the face of the tube sheet flush.

In the carrying out of my invention I employ tubes 10 each provided with a flared or bell mouth end 11; a tube sheet 20 provided with a plurality of tube openings 21 each having a flared seat 22 and an enlarged screw threaded portion 23. Adapted to interfit with the screw threaded portion 23 of the tube sheet I provide a ferrule 30, provided with a central opening 31 shaped with a Venturi opening 32 and a tapered seat 34, at shown in the sections, and two longitudinal slots 33 oppositely disposed in the Venturi shaped sides of the ferrule extending through the tapered seat 34.

In assembling this fastening the tube 10 is inserted in the opening 21 so that the bell mouth 11 of the tube rests upon the flared seat 22. The ferrule is then screwed into place. It will be observed that the ferrule is so shaped on the seat end that a smooth joint on the inside of the tube is formed and at the same time the outer end of the ferrule is flush with the tube sheet.

In actual practice it has been found out that this type of fastening produces less agitation of water during its entrance into the inlet thereby providing less corrosion and a longer tube life.

As a tube replacement proposition my fastening may readily be adapted for tube sheets provided with standard counterbore openings now on the market in which the tubes have been heretofore inserted either by rolling or by fittings of other character. This is illustrated in Figures 4 and 5. In the tube sheet herein illustrated no flared seat 22 is provided in the counterbore as in my special tube sheet illustrated in Figures 1, 2 and 3. To take the place of this seat I provide a lead washer 40 of round cross section. When the ferrule 30 is screwed down flush with the tube sheet as shown in Figure 5 this lead washer 40 flows to the shape shown making a tight metal to metal joint.

I wish it distinctly understood that my tube fastening herein described and illustrated while especially designed for condenser tubes may also be used in boiler construction or any other type wherein it is desired to have a stream line flow through the tubes and as illustrated is in the form in which I desire to construct it but that changes or variations may be made as may be convenient or desirable without departing from the salient features of my invention and I therefore intend the following claims to cover such modifications as naturally fall within the lines of invention.

I claim:—

1. A tube fastening in combination, a tube sheet having an opening provided with a screw threaded counterbore having a seat therein, a bell mouth tube adapted to fit in the inner end of the counterbore, a ferrule threaded into the counterbore and having a bell shaped mouth in one end and a tapered seat on its other end to expand the bell mouth of the tube to conform to the seat in the counterbore, the opening in the ferrule being as large as that of the tube so as not to restrict the orifice of the tube.

2. A tube fastening in combination, a tube sheet provided with a bore and screw threaded counterbore, a seat in the shoulder between the bore and counterbore, a bell mouth tube adapted to fit in the bore and counterbore, a ferrule having the same inside diameter as the inside diameter of the tube adapted to fit the screw threaded portion and provided with a Venturi opening in the outer end and a conical seat in the inner end engaging the bell mouth of the tube forming it to the seat in the counterbore providing a smooth and unrestricted opening in the tube.

3. A tube fastening in combination, a tube sheet provided with a bore and a screw threaded counterbore, a bell mouth tube adapted to fit in the bore and counterbore, a soft metal washer of circular cross section interposed between the offset between bore and counterbore and the bell mouth of the tube, a ferrule with a conical seat in the inner end and a Venturi central opening in the outer end adapted to screw into the screw threaded counterbore to form the soft metal washer into a seat against the wall of the counterbore for the bell mouth of the tube.

In testimony whereof I affix my signature.

HORACE A. STAPLES.